United States Patent [19]

Ng

[11] Patent Number: 5,690,429
[45] Date of Patent: Nov. 25, 1997

[54] METHOD AND APPARATUS FOR EMISSIVITY INDEPENDENT SELF-CALIBRATING OF A MULTIWAVELENGTH PYROMETER

[76] Inventor: Daniel Ng, 3622 Lynnfield Rd., Shaker Heights, Ohio 44122

[21] Appl. No.: 783,640

[22] Filed: Jan. 14, 1997

Related U.S. Application Data

[63] Continuation-in-part of Ser. No. 353,521, Dec. 7, 1994, abandoned.

[51] Int. Cl.$^6$ ............................. G01K 15/00; G01J 5/00
[52] U.S. Cl. ........................ 374/1; 374/128; 374/127
[58] Field of Search ............................ 374/1, 2, 126, 374/127, 128

[56] References Cited

U.S. PATENT DOCUMENTS

| | | | |
|---|---|---|---|
| 3,454,769 | 7/1969 | Dynes | 374/127 |
| 3,795,918 | 3/1974 | Sunderland | 374/127 |
| 4,659,234 | 4/1987 | Brouwer et al. | 374/127 |
| 4,764,025 | 8/1988 | Jensen | 374/128 |
| 4,880,314 | 11/1989 | Kienitz | 374/2 |

FOREIGN PATENT DOCUMENTS

| | | | |
|---|---|---|---|
| 0532017 | 11/1976 | U.S.S.R. | 374/127 |
| 0800683 | 1/1981 | U.S.S.R. | 374/127 |
| 0800684 | 1/1981 | U.S.S.R. | 374/127 |
| 0981833 | 12/1982 | U.S.S.R. | 374/2 |

OTHER PUBLICATIONS

"Bristol–Velotron two color (ratio) Radiation Pyrometer," The Bristol Company, Bulletin P–1299, Waterbury, CT (Sep. 1965).

Hishikari, I., "Two–color pyrometers achieve impossible results," JEE (Japan), No. 130, pp. 42–45 (Oct. 1977).

Ruffino, G. et al., "A new infrared photoelectric pyrometer," High Temperatures–High Pressures, vol. 2, No. 2, pp. 227–235 (1970).

McGee, T., "Principles And Methods Of Temperature Measurement", published by John Wiley & Sons, pp. 370–371 (1988).

*Primary Examiner*—Diego F. F. Gutierrez
*Attorney, Agent, or Firm*—Kent N. Stone; Susan D. Reinecke

[57] ABSTRACT

Self calibrating a pyrometer includes taking two different temperatures thereby generating two voltage spectra, calculating the spectra ratio R of the two voltage spectra, determining the slope of the plot of the logarithm of the spectrum ratio versus $c_2/\lambda$ to arrive at a relationship between $T_1$ and $T_2$, solving for $T_1$ within the spectra ratio, and arriving at a value for $T_2$ by substituting experimentally measured values for R into the spectra ratio equation. This method is then repeated for the determination of $T_2$. The pyrometer calibration constant $h_\lambda$ can then be determined by dividing the measured voltage spectra by the planck function at the known temperature (i.e., $T_1$ or $T_2$). Measurement of subsequent temperatures can now be determined by measuring the voltage spectra and dividing by the calibration constant $h_\lambda$ which will result in a planck function $L_\lambda(T)$ which can be solved to yield the surface temperature.

10 Claims, 7 Drawing Sheets

METHOD AND APPARATUS FOR EMISSIVITY INDEPENDENT SELF-CALIBRATING OF A MULTIWAVELENGTH PYROMETER

This application is a continuation-in-part of application Ser. No. 08/353,521 filed Dec. 7, 1994, now abandoned.

ORIGIN OF THE INVENTION

The invention described herein was made by an employee of the U.S. Government and may be manufactured or used by or for the Government without the payment of any royalties thereon or therefor.

BACKGROUND OF THE INVENTION

1. Field of the invention

This invention relates to self-calibrating pyrometers, and more particularly to a method and apparatus that make use of temperature measurements of arbitrary target surfaces in performing instrument calibration, thereby effectively eliminating reliance on controlled target emissivity and avoiding instrument drift between uses.

2. Description of Related Art

The principle of operation of a pyrometer is based on Planck's law of radiation. Traditional pyrometers are one and two-color pyrometers, multi-color and multiwavelength pyrometers. One-color temperature pyrometers require knowing the emissivity of the target surface at the recording wavelength. Two-color pyrometers assume that the emissivity is the same at the two wavelengths or the ratio of the emissivity of the two wavelengths is known. Multi-color pyrometers measure radiation at several wavelengths and measure temperature by solving an algebraic equation. Multiwavelength pyrometers measure the temperature by curve fitting the experimental data to a mathematical relation containing one unknown constant.

The disadvantages of existing systems include the constant need for direct or indirect knowledge of the emissivity of the target surface. If the surface emissivity is not available for an uncharacterized surface, estimation of emissivity is required, causing other assumptions to be incorrect. In addition, emissivity values are usually measured on a different sample rather than on the sample of interest. An additional disadvantage includes the constant need for pre-calibrating a pyrometer for each new application.

U.S. Pat. No. 4,579,461 to Rudolph discloses a method and apparatus for measuring a target surface temperature of a heated object comprising two radiation sensors for receiving and responding to two distinct target surface radiation wavelengths at the same target surface location. The output current, within the short wavelength range is fed through a series of circuits and added. Next, a target surface temperature is taken after the target surface is inserted into a furnace. The furnace, acting like a Black Body, will have an emittance of 1 as the target surface temperature approaches that of the furnace. Applying Wien's Law, a direct relation develops between the target surface and furnace temperatures and the outputs of the two radiation sensors. When the target surface and furnace temperatures are equal, a ratio of the two sensor outputs is taken. The ratio decreases as the target surface temperature increases, provided the numerator sensor receives longer wavelength radiation. A difference in the amount of short and long wavelength radiation received, as target surface temperature increases, is applied to determine the actual target surface temperature. Adjustments are made if a combination of reflected and emitted radiation is received by the sensors. The Rudolph method and apparatus differs from the instant invention in that emissivity and Black Body conditions are factored into the temperature determination.

U.S. Pat. No. 4,708,493 to Stein discloses a method for determining the temperature of an unknown radiation source comprising the steps of selecting two wavelengths to be included in the band of wavelengths emitted by the target and calculating the emissivity of the target at the two wavelengths; substituting these values into Planck's formula for spectral radiance; irradiating the target with a beam of known radiation and solving for the relative reflected radiation (bi-directional reflectivity) with the aid of Kirchhoff's law; taking the ratio of the bi-directional reflectivity to the hemispherical reflectivity to arrive at a value that is the same for the two selected wavelengths; and calculating the ratio of the relative reflected radiance at each selected wavelength to the target emissivity at the selected wavelength. Thus, four equations with three unknowns are left to be solved by known numerical techniques. Stein differs from the instant invention in that Stein measures the reflectivity by a direct in-situ method in order to obtain temperature.

U.S. Pat. No. 4,880,314 to Kienitz discloses a pyrometric measurement method and a multi-channel pyrometer for measuring target surface temperatures having different emissivities. The method comprises measuring the spectral voltage signal of a temperature $U_j$ at $j=1$ to n wavelengths and obtaining information from at least two different wavelength readings and information concerning the object temperature and emissivity relationships for target sample materials. The spectral signal voltages are determined from a difference between the object and surrounding temperatures for a discrete number of wavelengths of different emissivities. From this difference the probable temperatures are determined. This method differs from the instant invention in that Kienitz derives a function estimation of target surface emissivity rather than calibrating the pyrometer independent of emissivity.

U.S. Pat. No. 5,132,922 to Khan et al., discloses a method and apparatus for detecting temperature of a target sample. Incoming radiation is filtered and directed onto photosensitive devices that convert the incoming radiation into an electronic radiance signal (ERS). The ERS is a value recognized by a computer. After the ERS is generated, an emissivity model function (EMF) is selected. The EMF is multiplied by the radiance/temperature relation (RTR), a derivative of Planck's radiance formula, to arrive at the radiance/wavelength function (RWF). EMF is an assumed function of the detected wavelength. The computer is then used to establish a difference function (DF) formed by the difference between the RWF and ERS. The computer then curve fits the RWF to the ERS by determining variables within the EMF that provide the least DF. Curve fitting uses the linear or non-linear least squares methods. Temperature and error estimation results from the curve fitting step. In the method, an analytical formula for emissivity is assumed, whereas in the instant invention, determining emissivity at each wavelength is eliminated.

U.S. Pat. No. 4,881,823 to Tanaka et al. discloses a method for determining the temperature of a heated target based on prior knowledge of an emissivity function describing the relationship between two target wavelength emissivities. The two radiances corresponding to the two wavelengths are measured, the target temperature is assumed, and the two emissivities are calculated. This method differs from the instant invention in that there is a reliance on prior information concerning target emissivity, whereas the instant invention operates independent of target emissivity.

SUMMARY OF THE INVENTION

It is an object of the invention, therefore, to provide a method and apparatus for self-calibrating a pyrometer independent of a target emissivity determination.

It is another object of the invention to provide a method for self-calibrating a pyrometer absent use of a Black Body radiation source and discontinued or interrupted use.

The present invention provides these and other features in a method and apparatus for self-calibrating a pyrometer comprising measuring two voltage spectra at two unknown temperatures, and calibrating the pyrometer independent of emissivity in accordance with the two voltage spectra.

A ratio of the measured two voltage spectra is determined in accordance with Planck's law of radiation. A logarithm of the measured two voltage spectra ratio is plotted versus $c_2/\lambda$, where $c_2$ is a radiation constant and $\lambda$ is the wavelength, and a slope of the plot is determined, wherein calibrating the pyrometer includes calculating the two unknown different temperatures in accordance with the slope and the measured two voltage spectra ratio.

BRIEF DESCRIPTION OF THE DRAWINGS

A more complete understanding of the present invention can be obtained by considering the following detailed description in conjunction with the accompanying drawings, in which.

DETAILED DESCRIPTION OF PREFERRED EMBODIMENTS

The following detailed description of preferred embodiments is applicable to numerous calibration techniques and pyrometers as would be contemplated by those of ordinary skill.

The fundamental equation of pyrometry is Planck's law of radiation:

$$L_\lambda(T) = \frac{c_1}{\lambda^5} \frac{1}{\exp(c_2/\lambda T) - 1} \quad (1)$$

where $L_\lambda(T)$ is the radiance at wavelength $\lambda$ produced by a blackbody whose temperature is T. The spectral intensity of radiation, $L_\lambda(\epsilon,T)$, emitted from a surface whose temperature is T, at wavelength $\lambda$, and spectral emissivity $\epsilon(\lambda)$, is given by:

$$L_\lambda(\epsilon,T) = \epsilon(\lambda)L_\lambda(T) = \epsilon(\lambda)\frac{c_1}{\lambda^5}\frac{1}{\exp(c_2/\lambda T)-1} \quad (2)$$

where $c_1$ and $c_2$ are radiation constants.

Figure 1:
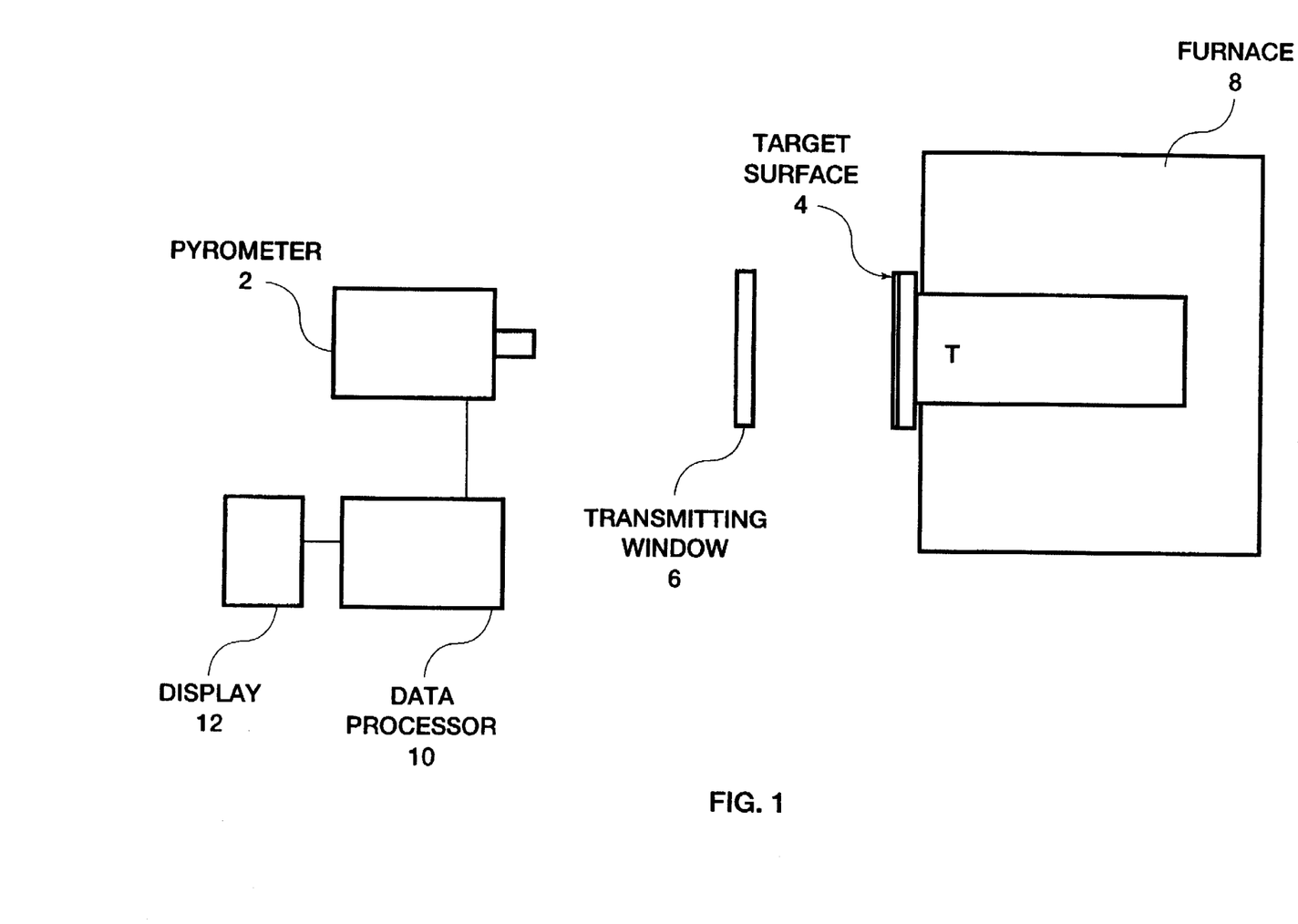
FIG. 1 illustrates a pyrometer arrangement.

FIG. 1 depicts a schematic arrangement for experimentally determining a spectra ratio for a target surface wherein pyrometer 2 measures a voltage spectrum through a transmitting window 6 from a target surface 4 housed within a furnace 8. Information from pyrometer 2 is fed into an appropriate data processor 10 and output via a display 12 as would be known to those skilled in the art. Furnace 8 creates Black Body conditions such that the spectra emissivity approaches 1. Although spectra from a Black Body surface is employed here, spectra from any source would produce the same ratio results because at each wavelength, the emissivity would divide out as unity (discussed below).

Figure 2:
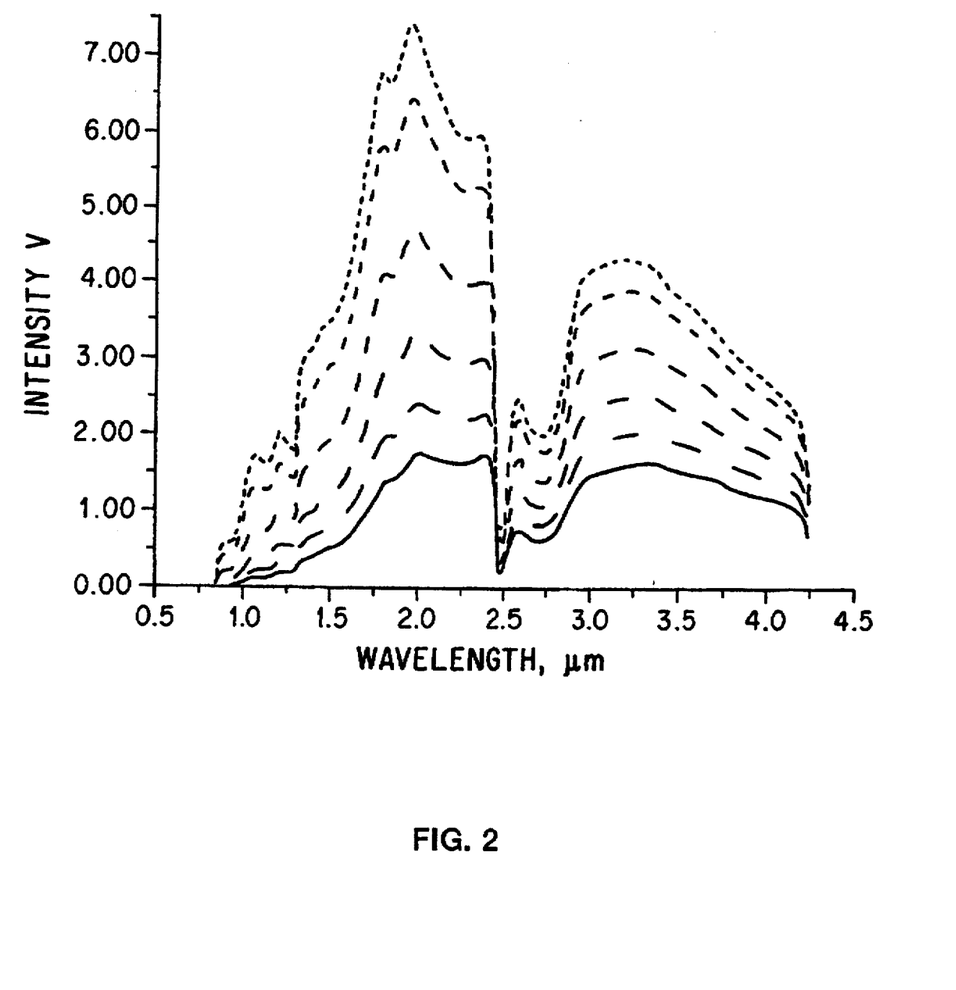
FIG. 2 is a graphical representation of six voltage spectra recorded at different temperatures.
Figure 3:
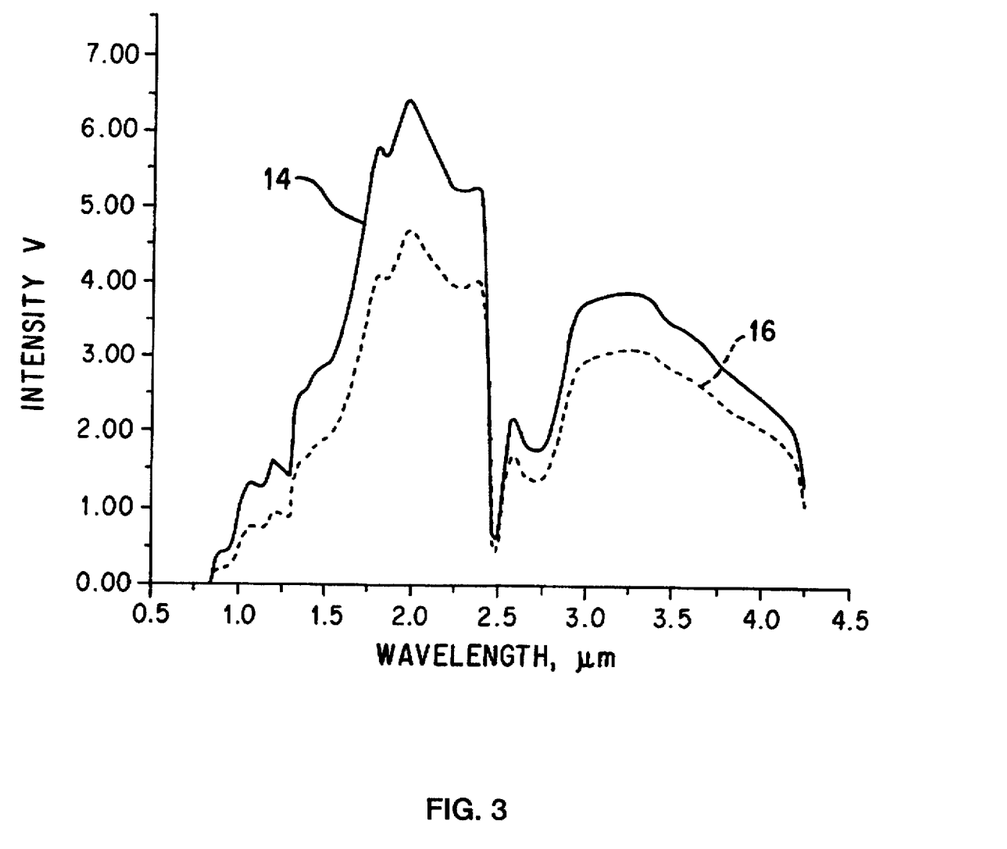
FIG. 3 depicts two voltage spectra selected from the six shown in FIG. 2.

The pyrometer's voltage spectrum output, $V(\lambda,T)$, is given by:

$$V(\lambda,T) = h_\lambda L_\lambda(T) = h_\lambda \frac{c_1}{\lambda^5}\frac{1}{\exp(c_2/\lambda T)-1} \quad (3)$$

where $h_\lambda$ is the calibration constant of the pyrometer. The calibration constant $h_\lambda$ represents the following:

$$h_\lambda = (\gamma_\lambda)(\epsilon_\lambda)(g_\lambda) \quad (4)$$

where $\gamma_\lambda$ is the window transmissivity constant, $\epsilon_\lambda$ is the target surface emissivity constant and $g_\lambda$ is the instrument constant. Two voltage spectra for unknown and different temperatures, $T_1$ and $T_2$, are measured with an uncalibrated pyrometer. Temperatures $T_1$ and $T_2$ are known to be different if the measured voltage spectra are different. FIG. 3 illustrates two voltage spectra 14 and 16 selected from the six voltage spectra shown in FIG. 2.

The ratio of the two voltage spectra is then determined. The ratio is determined from a wavelength by wavelength division of these two voltage spectra according to the following equations:

$$R(\lambda, T_1, T_2) = V(\lambda, T_1)/V(\lambda, T_2) \quad (5)$$
$$R(\lambda, T_1, T_2) = L_\lambda(T_1)/L_\lambda(T_2)$$
$$R(\lambda, T_1, T_2) = \frac{\exp(c_2/\lambda T_2) - 1}{\exp(c_2/\lambda T_1) - 1}$$

which is a function of $\lambda$ containing two parameters $T_1$ and $T_2$. Emissivity does not change with either temperature reading and is therefore cancelled out of the resulting spectra ratio. Wien's approximation of Planck's formula simplifies equation (5) to arrive at the following equation:

$$R(\lambda,T_1,T_2) = \exp\{c_2/\lambda(1/T_2 - 1/T_1)\} \quad (6)$$

The logarithm of the spectra ratio according to equation (6), is defined according to:

$$\text{Log } R(\lambda,T_1,T_2) = c_2/\lambda(1/T_1 - 1/T_2) \quad (7)$$

Plotting the log $R(\lambda,T_1,T_2)$ versus $c_2/\lambda$ gives a straight line whose slope s is defined according to the following equation:

$$s = 1/T_1 - 1/T_2 \quad (8)$$

Figure 4:
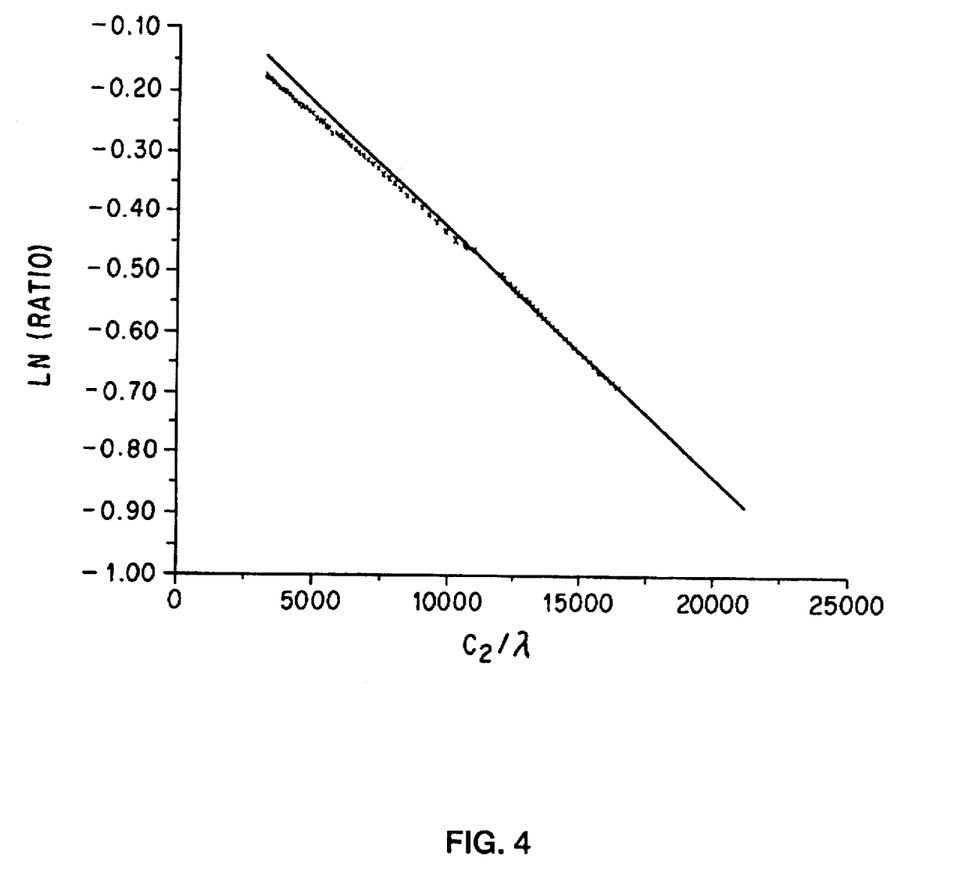
FIG. 4 is a plot of the natural logarithm of the spectra ratio shown in FIG. 3 vs. $c_2/\lambda$.

This is shown in FIG. 4. At each wavelength $\lambda$, using the slope equation (8) to solve $1/T_1$ in terms of $1/T_2$ and substituting into the spectra ratio equation (5), $T_2$ and $T_1$ are then determined to be:

$$T_2(\lambda) = \cfrac{\cfrac{c_2}{\lambda}}{\ln\left[\cfrac{1-R(\lambda, T_1, T_2)}{1-R(\lambda, T_1, T_2)\exp\left(\cfrac{c_2}{\lambda}s\right)}\right]} \quad (9a)$$

$$T_1(\lambda) = \cfrac{1}{s + \cfrac{1}{T_2(\lambda)}} \quad (9b)$$

Figure 5:
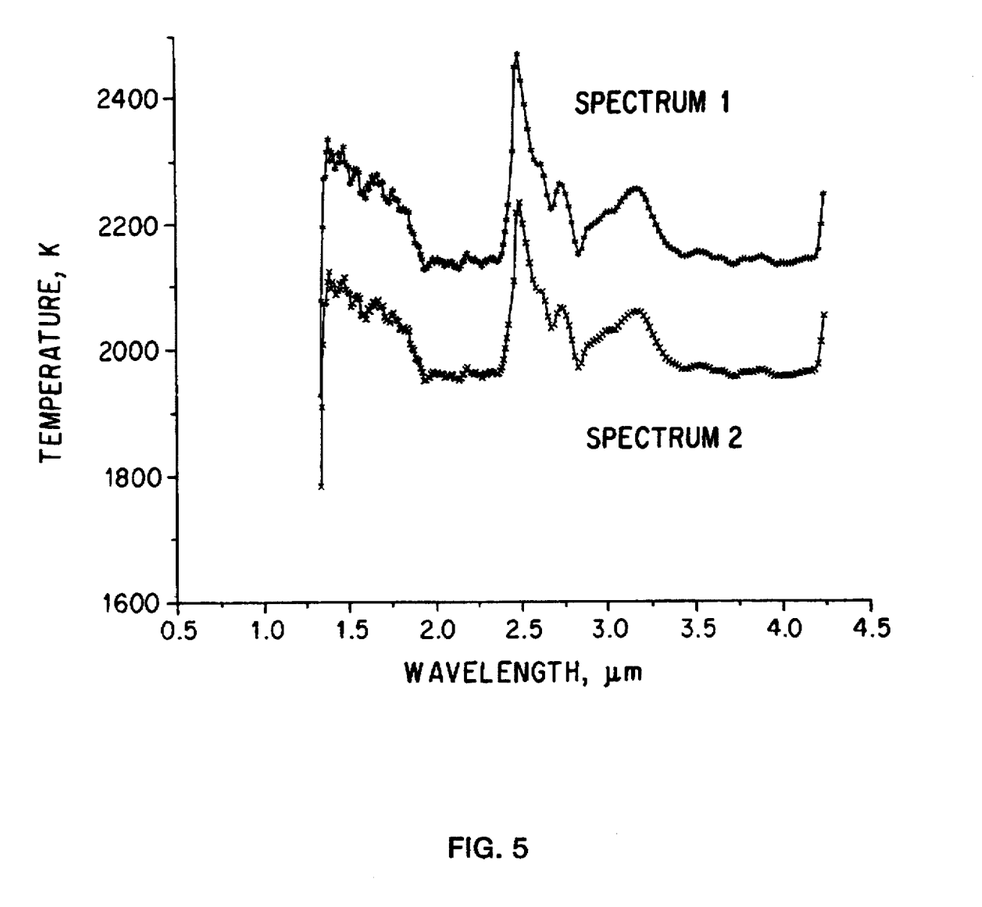
FIG. 5 is a plot of solution temperatures $T_1$ and $T_2$ vs. wavelength.

The equations (9a) and (9b) are solved simultaneously at each wavelength to determine $T_1$ and $T_2$. These equations however, do not have a solution at all wavelengths, because in the short wavelength region, where Wien's law is valid, the argument of the logarithm is zero in the denominator; therefore, the equation cannot have a valid solution. In actual data, the quantities $1-R(\lambda,T_1,T_2)$ and $1-R(\lambda, T_1,T_2)\exp(c_2/\lambda)$ might even be negative, and hence, the logarithm is undefined. Solutions are determined only in the long wavelength data region provided by the multiwavelength pyrometer. The solution temperatures $T_1$ and $T_2$ at wavelength regions where they exist are shown in FIG. 5. Their averages represent an error of 1.8% from the actual temperatures of 2133K and 1955K.

Figure 6:
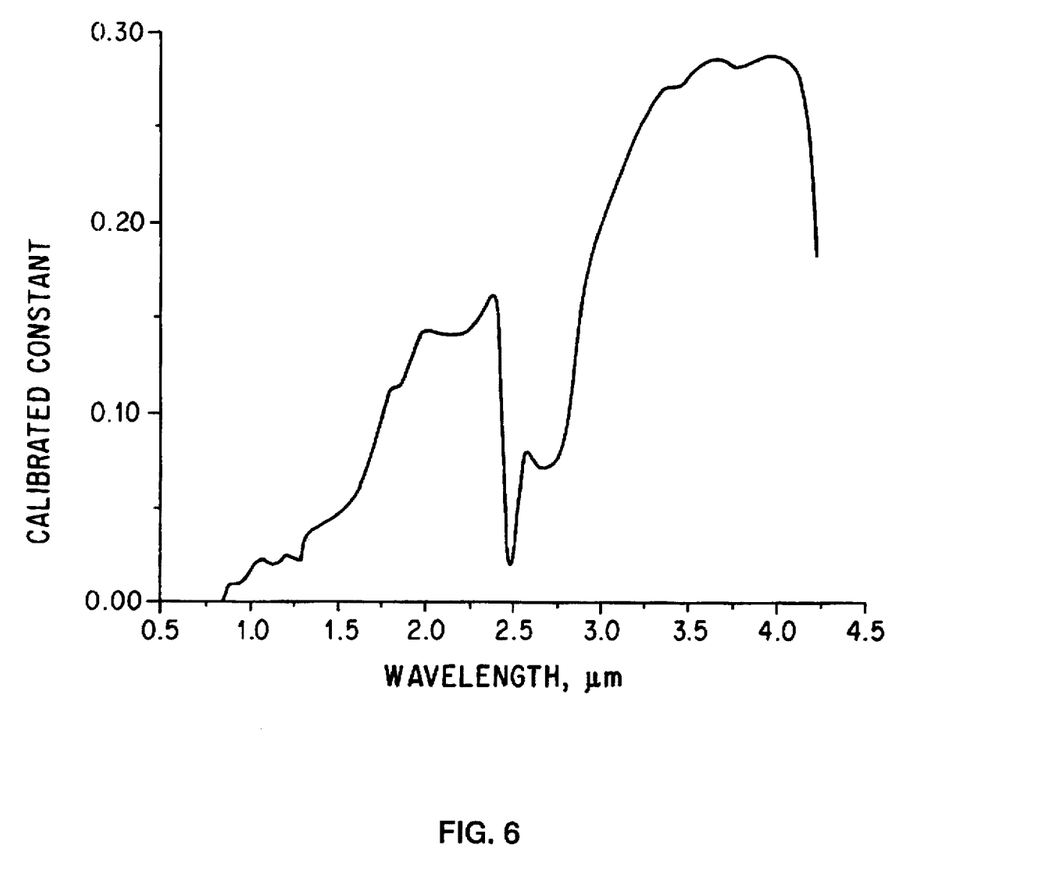
FIG. 6 is a plot of the calibration constant as a function of wavelength.
Figure 7:
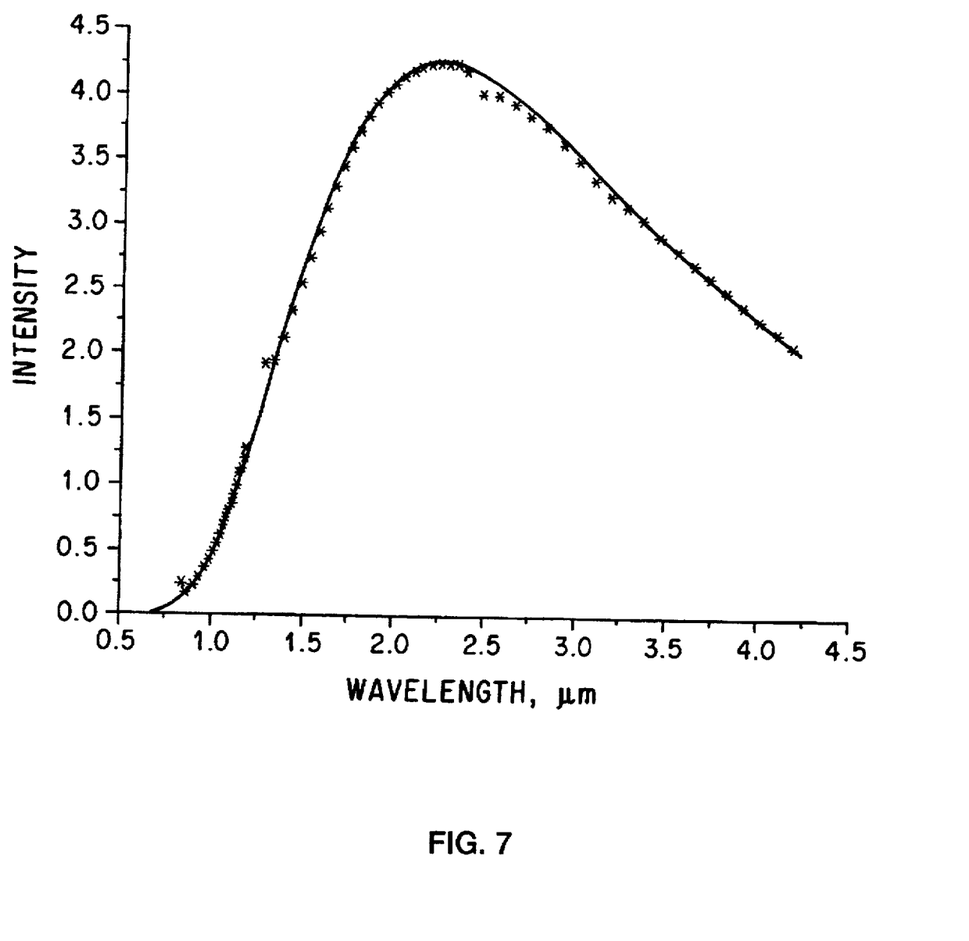
FIG. 7 illustrates a voltage spectrum divided by the calibration function compared with a calibrated determination of the same spectra.

Once temperatures $T_1$ and $T_2$ are known, the calibration constant $h_\lambda$ for the pyrometer is calculated. The calibration constant $h_\lambda$ can be determined from the following equation:

$$h_\lambda = V(\lambda,T)/L_\lambda(T) \quad (10)$$

where $V(\lambda,T)$ is the meaured voltage spectra for the target surface at either known temperature $T_1$ or $T_2$, and $L_\lambda(T)$ is the Planck function at known temperatures $T_1$ or $T_2$, respectively. The calibration function $h_\lambda$ as a function of wavelength is shown in FIG. 6. Measurement of subsequent unknown temperatures of a target surface can now be done by measuring the voltage spectra. Division of this voltage spectra by the calibration function $h_\lambda$ will result in a Planck function $L_\lambda(T)$ that can immediately be analyzed by the data processor to yield the target surface temperature that the Planck function represents. An example of a voltage spectra divided by a calibration function in comparison with a calibrated determination of the same spectra is illustrated in FIG. 7. As is shown by FIG. 7, a high level of consistency exists between the two spectra.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

I claim:

1. A method of self-calibrating a pyrometer, comprising:
   measuring two voltage spectra at two unknown and different temperatures; and calibrating said pyrometer independent of emissivity in accordance with said two voltage spectra.

2. The method according to claim 1, wherein said step of calibrating further comprises:
   determining a ratio of the measured two voltage spectra, wherein this ratio is the spectra ratio, in accordance with Planck's law of radiation;
   plotting a logarithm of said measured two voltage spectra ratio at a short wavelength versus $c_2/\lambda$, where $c_2$ is a radiation constant and $\lambda$ is the wavelength; and
   determining a slope of a plot from the plotting step, wherein said calibrating step comprises calculating said two unknown different temperatures in accordance with said slope and said measured two voltage spectra ratio.

3. The method according to claim 2, wherein said two unknown different temperatures comprise a first temperature $T_1$ and a second temperature $T_2$, said calibrating step further comprises:
   solving for $1/T_1$ in terms of $1/T_2$ from said slope at a wavelength $\lambda$ in a long wavelength region;
   substituting said $1/T_1$ value into said measured spectra ratio, thereby obtaining a relationship between said spectra ratio and $T_2$;
   and solving for $T_2$ using said relationship and obtaining a value for $T_1$.

4. The method according to claim 1, wherein the step of determining a spectra ratio R comprises solving the following equation:

$$R = (\exp(c_2/\lambda T_2)-1)/(\exp(c_2/\lambda T_1)-1)$$

where R is the spectra ratio, $c_2$ is a radiation constant, $\lambda$ is a wavelength, and $T_1$ and $T_2$ are said two unknown different temperatures.

5. The method according to claim 1, wherein said step of calibrating further comprises solving for a calibration constant, $h_\lambda$, in accordance with the following equation:

$$h_\lambda = V(\lambda,T)/(L_\lambda(T))$$

where $V(\lambda,T)$ is the measured voltage spectra at wavelength $\lambda$ and temperature T, and $L_\lambda(T)$ is spectral intensity of radiation emitted from a target surface of temperature T.

6. A self-calibrating pyrometer, comprising:
   means for measuring two voltage spectra at two unknown different temperatures; and
   means for calibrating the pyrometer independent of emissivity in accordance with said two voltage spectra.

7. The self-calibrating pyrometer according to claim 6, wherein said means for calibrating further comprises:
   means for determining a ratio of the measured two voltage spectra wherein this ratio is the spectra ratio, in accordance with Planck's law of radiation;
   means for plotting a logarithm of said measured spectra ratio at a short wavelength versus $c_2/\lambda$ where $c_2$ is a radiation constant and $\lambda$ is the wavelength;
   means for determining a slope of said plot; and
   means for calculating said two unknown different temperatures in accordance with said slope and said measured two voltage spectra ratio.

8. The self-calibrating pyrometer according to claim 7, wherein said two unknown different temperatures comprise a first temperature $T_1$ and a second temperature $T_2$, further comprising:
   means for solving for $1/T_1$ from said slope;
   means for substituting said solved $1/T_1$ value into said measured spectra ratio, thereby obtaining a relationship between said spectra ratio and $T_1$; and
   means for solving for $T_2$ from said relationship.

9. The self-calibrating pyrometer according to claim 8, wherein said spectra ratio R is defined by the following equation:

$$R = (\exp(c_2/\lambda T_2)-1)/(\exp(c_2/\lambda T_1)-1)$$

where $c_2$ is a radiation constant, $\lambda$ is a wavelength, and $T_1$ and $T_2$ are said two unknown different temperatures.

10. The self-calibrating pyrometer according to claim 7, wherein said means for calibrating further comprises means for solving for a calibration constant $h_\lambda$ in accordance with the following equation:

$$h_\lambda = V(\lambda,T)/L_\lambda(T)$$

where $V(\lambda,T)$ is the measured voltage spectra at wavelength $\lambda$ and temperature T, and $L_\lambda(T)$ is spectral intensity of radiation emitted from a target surface of temperature T.

* * * * *